United States Patent
Sun et al.

(10) Patent No.: US 11,947,974 B2
(45) Date of Patent: Apr. 2, 2024

(54) APPLICATION START METHOD AND ELECTRONIC DEVICE

(71) Applicant: Honor Device Co., Ltd., Shenzhen (CN)

(72) Inventors: Wenyong Sun, Shenzhen (CN); Yulin Ren, Shenzhen (CN); Feng Han, Shenzhen (CN); FeiFei Cheng, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 23 days.

(21) Appl. No.: 17/635,606

(22) PCT Filed: Sep. 17, 2020

(86) PCT No.: PCT/CN2020/116009
§ 371 (c)(1),
(2) Date: Feb. 15, 2022

(87) PCT Pub. No.: WO2021/052437
PCT Pub. Date: Mar. 25, 2021

(65) Prior Publication Data
US 2022/0308899 A1   Sep. 29, 2022

(30) Foreign Application Priority Data

Sep. 19, 2019   (CN) .......................... 201910889425.5

(51) Int. Cl.
*G06F 9/44*       (2018.01)
*G06F 9/4401*     (2018.01)
(Continued)

(52) U.S. Cl.
CPC ............ *G06F 9/44521* (2013.01); *G06F 9/44* (2013.01); *G06F 9/4401* (2013.01);
(Continued)

(58) Field of Classification Search
CPC .............. G06F 9/44521; G06F 9/4401; G06F 9/44505; G06F 9/4881; G06F 21/604;
(Continued)

(56) References Cited

U.S. PATENT DOCUMENTS

| 9,183,008 B2 | 11/2015 | Honghui |
| 2005/0114771 A1* | 5/2005 | Piehler .................... G06F 40/10 |
| | | 715/264 |

(Continued)

FOREIGN PATENT DOCUMENTS

| CN | 102439564 A | 5/2012 |
| CN | 104239764 A | 12/2014 |

(Continued)

OTHER PUBLICATIONS

Jain Ayusch, "Android Internals: Android OS Bootup Process" Jul. 10, 2019, 8 pgs < Ayusch_Booting.pdf>.*

(Continued)

*Primary Examiner* — Tuan A Vu
(74) *Attorney, Agent, or Firm* — Slater Matsil, LLP

(57) ABSTRACT

Disclosed are an application start method and an electronic device. The method includes: obtaining, by a SystemServer process in an electronic device, a start message of a first application; sending, by the SystemServer process, a creation request for an application process to a daemon process in response to the start message, where the creation request includes application information of the first application; creating, by the daemon process, the application process for the first application in response to the creation request, where the application process includes a first thread and a second thread; executing, by the application process, the first thread and the second thread in parallel, where the first thread executes initialization of a main thread of the first application, and the second thread creates a first class loader (Continued)

according to the application information to load a class file of the first application.

14 Claims, 10 Drawing Sheets

(51) Int. Cl.
  *G06F 9/445* (2018.01)
  *G06F 9/48* (2006.01)
(52) U.S. Cl.
  CPC .......... *G06F 9/44505* (2013.01); *G06F 9/48* (2013.01); *G06F 9/4881* (2013.01)
(58) Field of Classification Search
  CPC ........ G06F 40/10; G06F 21/53; G06F 9/5033; G06F 9/44; G06F 9/48
  See application file for complete search history.

(56) References Cited

U.S. PATENT DOCUMENTS

| | | | |
|---|---|---|---|
| 2006/0070051 | A1 | 3/2006 | Norbert et al. |
| 2007/0192623 | A1* | 8/2007 | Chandrasekaran ..... G06F 21/53 713/189 |
| 2018/0253315 | A1* | 9/2018 | Norton .................. G06F 9/5033 |
| 2018/0302443 | A1* | 10/2018 | Weiss .................... G06F 21/604 |

FOREIGN PATENT DOCUMENTS

| | | |
|---|---|---|
| CN | 104239781 A | 12/2014 |
| CN | 106020957 A | 10/2016 |
| CN | 106445617 A | 2/2017 |
| CN | 106547598 A | 3/2017 |
| CN | 108183871 A | 6/2018 |
| CN | 109582385 | 4/2019 |
| CN | 109885340 A | 6/2019 |
| CN | 110018855 A | 7/2019 |
| JP | 2002140195 A | 5/2002 |

OTHER PUBLICATIONS

Guo et al, CN 106203120, (translation), Mar. 5, 2019, 14 pgs <CN_106203120.pdf>.*
JP 6564845, (translation), Aug. 21, 2019, 20 pgs <JP_6564845.pdf>.*
Zhao et al, CN 107689894, (translation), Feb. 13, 2018,25 pgs <CN_107689894.pdf>.*
Uemura et al, CN 101017440, (translation), Dec. 28, 2011, 8 pgs <CN_101017440.pdf>.*
Gong, S. et al., "Research and Practice of Automatic Loading of Applications based on Multi-threaded Protection", Journal of Xi'an University of Science and Technology, Mar. 2013, 6 Pages, vol. 33, No. 2.
Anonymous, "Dalvik—Understanding Android:Zygote and DalvikVM—Stack Overflow", XP055958012, May 5, 2019, Retrieved from the Internet:URL:https://stackoverflow.com/questions/9153166/understanding-android-zygote-and-dal.vikvm.

* cited by examiner

APPLICATION START METHOD AND ELECTRONIC DEVICE

CROSS-REFERENCE TO RELATED APPLICATIONS

This application is a National Stage of International Application No. PCT/CN 2020/116009, filed on Sep. 17, 2020, which claims priority to Chinese Patent Application No. 201910889425.5, filed on Sep. 19, 2019, both of which are hereby incorporated by reference in their entireties.

TECHNICAL FIELD

This application relates to the field of terminal technologies, and in particular, to an application start method and an electronic device.

BACKGROUND

Various applications (applications, APPs) installed on an electronic device such as a mobile phone have been widely used in users' daily life. A mobile phone is used as an example. A period from the moment at which a user clicks on a start icon of an application to the moment at which the first frame of picture of the application is displayed after the mobile phone runs code of the application may be referred to as a start time of the application. The start time directly affects the use experience of the application for the user, and is one of the important indicators for evaluating the performance of the mobile phone.

When the application starts, if there is no process of the application in the background of the mobile phone, a system of the mobile phone needs to recreate a new process and allocate the process to the application. This start mode may be referred to as a cold start. During the cold start, the mobile phone needs to create an application process of the application, execute a main function in a main thread (ActivityThread) of the application process, and load a class file of the application into a memory of the mobile phone by creating a class loader of the application process. This leads to a relatively long start time during the cold start of the application, and the use experience is inadequate when the user opens the application.

SUMMARY

This application provides an application start method and an electronic device, which can shorten a start time consumed when an application is cold-started, thereby improving the use experience when a user opens the application.

To achieve the foregoing objective, the following technical solutions are used in this application:

According to a first aspect, this application provides an application start method, including: obtaining, by a SystemServer process in an electronic device, a start message of a first application; sending, by the SystemServer process, a creation request for an application process to a daemon process (for example, a Zygote process) in response to the start message, where the creation request includes application information of the first application; creating, by the daemon process, the application process for the first application in response to the creation request, where the application process includes a first thread and a second thread; further executing, by the created application process, the first thread and the second thread in parallel, where the first thread executes initialization of a main thread of the first application, and the second thread creates a first class loader according to the application information to load a class file of the first application; and starting, by the application process of the first application, to run code of the first application after the initialization of the main thread is completed and the class file is successfully loaded, to display an application interface of the first application.

That is, after the daemon process creates the application process of the first application, the application process may complete, in a multithreaded parallel manner, the work of initializing the main thread and loading the class file. In this way, the class loader of the first application may be created to load the class file while the main thread of the application is initialized, to shorten a start time consumed when an application is cold-started, thereby improving the use experience when a user opens the application.

In a possible implementation, the application information records one or more class loaders required when the first application runs. For example, the application information records an identification of the first class loader. In this case, the creating, by the second thread, a first class loader according to the application information to load a class file of the first application includes: creating, by the second thread, the first class loader according to the identification of the first class loader, and loading a first class file of the first application by using the first class loader.

In a possible implementation, the application information may further record an identification of a second class loader. The application process created by the daemon process further includes a third thread. In this case, the application process of the first application may execute the first thread, the second thread, and the third thread in parallel, where the third thread may create the second class loader according to the identification of the second class loader, and use the second class loader to load a second class file of the first application. That is, if a plurality of class loaders are required when the first application starts, the application process may load the class files while creating the plurality of class loaders in parallel in a multithreaded manner, thereby shortening the start time when the application is cold-started.

In a possible implementation, the application information further records a dependency relationship between the class loaders. For example, the application information further records an identification of a second class loader in addition to the identification of the first class loader, and the second class loader depends on the first class loader; then, the application process created by the daemon process further includes the third thread; and the third thread may create the second class loader according to the identification of the second class loader after the third thread obtains an object lock released by the second thread, and use the second class loader to load a second class file of the first application. That is, if the plurality of class loaders that are required when the first application starts already have a dependency relationship, the application process may first create in parallel class loaders that have no dependency relationship to load the class files. Compared with a mode in which each class loader is created in a serial manner to load the class file, this mode can also shorten the start time when the application is cold-started.

In a possible implementation, the application information further records an identification of the second class loader in addition to the identification of the first class loader; and in this case, after the creating, by the second thread, the first class loader according to the identification of the first class loader, and loading a first class file of the first application by using the first class loader, the method further includes: creating, by the second thread, the second class loader according to the identification of the second class loader, and using the second class loader to load a second class file of the first application. That is, the second thread parallel to the first thread may serially create the plurality of class loaders to load the class files.

In a possible implementation, the starting, by the application process, to run code of the first application includes: starting, by the application process, to run the code of the first application after the first thread obtains the object lock released by the second thread.

Certainly, if the application process further uses another thread to create a class loader to load a class file, the first thread further needs to obtain an object lock released by the another thread in addition to the object lock released by the second thread, and further starts to run the code of the first application. That is, when the initialization of the main thread of the first application ends, and the class file of the first application is successfully loaded, the code of the first application may start to be run.

In a possible implementation, before the sending, by the SystemServer process in the electronic device, a creation request for an application process to a daemon process, the method further includes: obtaining, by the SystemServer process, the application information of the first application from an APK file of the first application; and further adding, by the SystemServer process, the application information to the creation request for the application process.

In a possible implementation, the first thread may be a main thread of the application process, and the second thread may be a temporary thread of the application process; and in this case, after the creating, by the daemon process in the electronic device, the application process for the first application, the method further includes: creating, by the main thread of the application process, the temporary thread, and allocating the identification of the first class loader to the temporary thread, so that the temporary thread may create, according to the identification of the first class loader, the first class loader to load the class file.

In a possible implementation, the obtaining, by a SystemServer process in an electronic device, a start message of a first application includes: generating, by a launcher in the electronic device, the start message of the first application in response to an operation that a user clicks on a start icon of the first application, and further receiving, by the SystemServer process, the start message of the first application sent by the launcher.

According to a second aspect, this application provides an application start method, including: obtaining, by a SystemServer process in an electronic device, a start message of a first application; and further starting, by the SystemServer process, to verify the start message, and invoking, by the SystemServer process, a first process in a process pool to start in advance to create a class loader of the first application to load a class file of the first application if the start message comes from a launcher because the SystemServer process generally successfully verifies the start message sent by the launcher. Subsequently, when the start message is successfully verified, the SystemServer process may continue to invoke the first process to initialize a main thread of the first application; and the first process may start to run code of the first application after the initialization of the main thread is completed and the class file is successfully loaded, to display an application interface of the first application.

That is, the SystemServer process may use the start message sent by the launcher as a trigger condition, invoke the first process in the process pool in advance to create a class loader that needs to be used when the application runs, and use the class loader to load a class file. In this way, before the first process used as the application process of the application runs the code of the application, the time consumed for initializing the main thread and loading the class file is reduced, thereby shortening the start time when the application starts.

In a possible implementation, the invoking, by the SystemServer process, a first process in a process pool to start to create a class loader of the first application to load a class file of the first application includes: storing, by the SystemServer process, an ID of the first process in the process pool as an ID of the application process of the first application; further transmitting, by the SystemServer, the application information of the first application to the first process, where the application information records an identification of the first class loader and an identification of the second class loader; and executing, by the first process, the first thread and the second thread in parallel, where the first thread creates the first class loader according to the identification of the first class loader, and loads a first class file of the first application by using the first class loader; and the second thread creates the second class loader according to the identification of the second class loader, and uses the second class loader to load a second class file of the first application. In this way, the plurality of class loaders are created in a multithreaded parallel manner to load the class files, which can shorten the loading time of the class files of the application, thereby shortening the time consumed when the application starts.

In a possible implementation, the invoking, by the SystemServer process, the first process to initialize a main thread of the first application includes: invoking, by the SystemServer process, the main thread in the first process according to an application process ID of the first application to execute a main function of ActivityThread to complete the initialization of the main thread of the first application because the SystemServer process has stored the ID of the first process in the process pool as an ID of the application process of the first application.

In a possible implementation, the starting, by the first process, to run code of the first application includes: starting, by the first process, to run the code of the first application after the main thread is initialized if the main thread obtains an object lock released by the first thread and an object lock released by the second thread, indicating that the class file of the application is also successfully loaded.

In a possible implementation, if the start message fails to be verified, the SystemServer process releases the occupied first process, and deletes the created class loader and the loaded class file, and the current start of this application is rejected by the SystemServer.

According to a third aspect, this application provides an electronic device, including a touchscreen, one or more processors, a memory, and one or more computer programs, where the processor is coupled to both the touchscreen and the memory, the one or more computer programs are stored in the memory, and when the electronic device is run, the processor executes the one or more computer programs stored in the memory, so that the electronic device performs the application start method according to any one of the foregoing.

According to a fourth aspect, this application provides a computer storage medium, including computer instructions, and the computer instructions, when run on an electronic device, cause the electronic device to perform the application start method according to any one of the first aspect.

According to a fifth aspect, this application provides a computer program product, and the computer program product, when run on an electronic device, causes the electronic device to perform the application start method according to any one of the first aspect.

According to a sixth aspect, this application provides a chip system, including at least one processor and at least one interface circuit, where the interface circuit is configured to read instructions stored in a memory, and send the instructions to the processor; and the instructions, when executed by the processor, cause the foregoing electronic device to perform the application start method according to any one of the foregoing.

It may be understood that, the electronic device according to the third aspect, the computer storage medium according to the fourth aspect, the computer program product according to the fifth aspect, and the chip system according to the sixth aspect that are provided above are all configured to perform the corresponding method provided above. Therefore, for beneficial effects that can be achieved therein, refer to beneficial effects in the corresponding method provided above, and details are not described herein again.

DETAILED DESCRIPTION OF ILLUSTRATIVE EMBODIMENTS

To clearly describe an application start method provided in embodiments of this application, some concepts that may appear in subsequent embodiments are first explained.

A process is a running activity of an application on a data set, and is a basic unit of an operating system (for example, an Android system) that performs resource allocation and scheduling. Each process occupies a memory space, and the application is run on the operating system in the form of one or more processes to implement corresponding functions.

A thread is an entity of a process, and is a basic unit that is smaller than the process and can run independently. The thread may share all resources owned by the process with other threads belonging to the same process. One thread may create or cancel another thread, and a plurality of threads in the same process may be executed in parallel.

An object lock is a mechanism that ensures that only one thread accesses a method or variable within the same period of time. In object-oriented languages such as Java, when accessing synchronized code, one thread needs to obtain an object lock to which the code belongs, or otherwise the thread is blocked until the object lock is released. The synchronized code may be a method or a statement block modified by a keyword.

That is, the object lock is a mutual exclusion lock. That is, at most only one thread may obtain the lock. When a thread A attempts to obtain an object lock held by a thread B, the thread A needs to wait or to be blocked. The thread A can obtain the object lock and access a corresponding method or variable only after the thread B releases the lock.

Thread blocking is generally a timeout phenomenon caused when a time for which one thread is paused during execution is greater than a preset value. For example, the thread A may continue to be executed only when an execution result of the thread B is used as an input parameter during execution. If failing to obtain the execution result of the thread B, the thread A pauses the execution. When the thread A fails to obtain the execution result of the thread B within a preset time, the thread A is blocked.

The following describes implementations of the embodiments in detail with reference to the accompanying drawings.

For example, an embodiment of this application provides an application start method applicable to an electronic device such as a mobile phone, a tablet computer, a notebook computer, an ultra-mobile personal computer (ultra-mobile personal computer, UMPC), a handheld computer, a netbook, a personal digital assistant (personal digital assistant, PDA), a wearable electronic device, an in-vehicle device, or a virtual reality device, which are not limited in this embodiment of this application.

Figure 1:
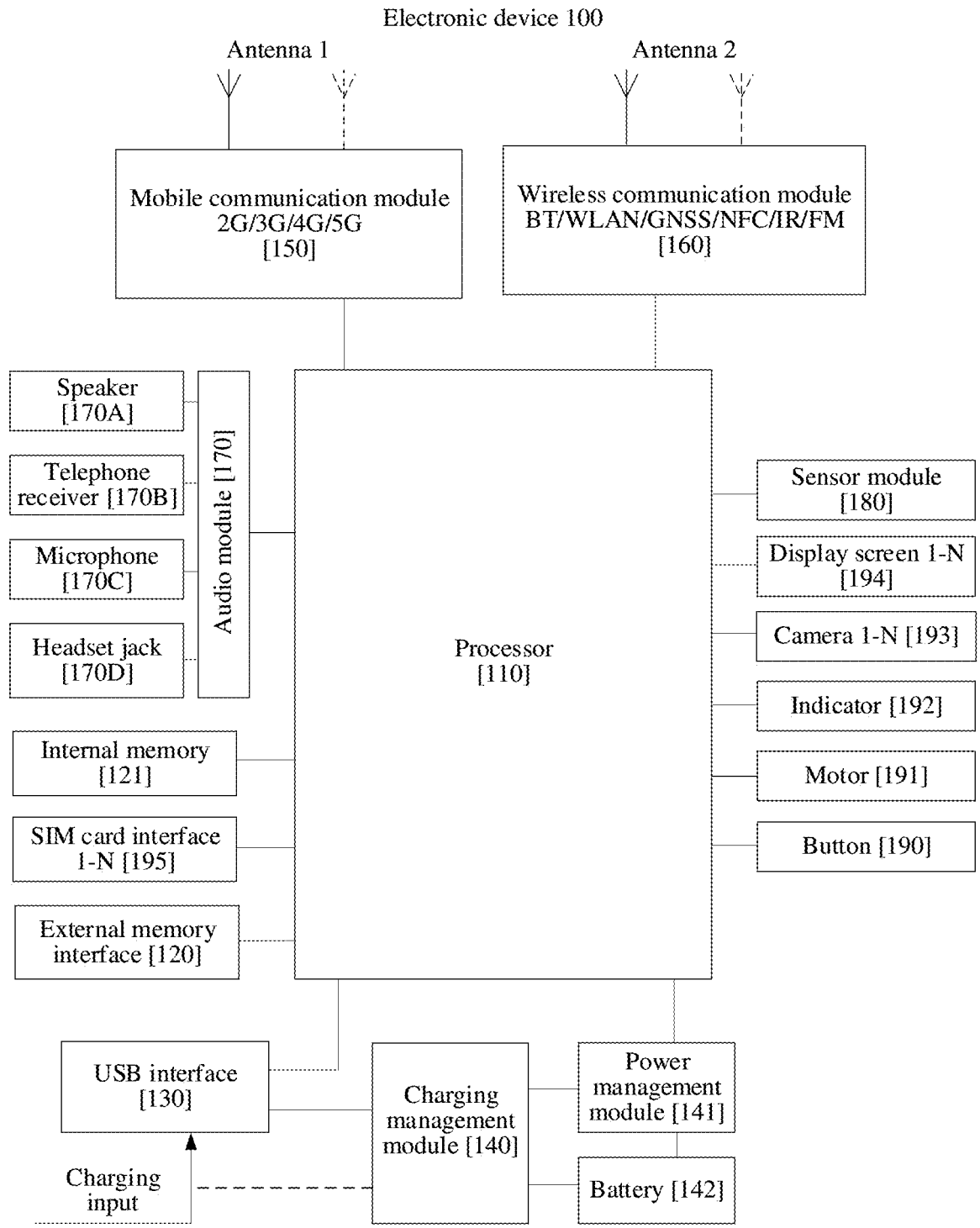
FIG. 1 is a schematic structural diagram 1 of an electronic device according to an embodiment of this application.

For example, FIG. 1 is a schematic structural diagram of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a camera 193, a display screen 194, and the like.

It may be understood that, the structure shown in this embodiment of the present invention does not constitute a specific limitation on the electronic device 100. In some other embodiments of this application, the electronic device 100 may include more or fewer components than those shown in the figure, or some components may be combined, or some components may be split, or a different component deployment may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

A memory may be further disposed in the processor 110, and is configured to store instructions and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The charging management module 140 is configured to receive a charging input from a charger. The charger may be a wireless charger, or may be a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 may receive an input of the battery 142 and/or the charging management module 140, to supply power to the processor 110, the internal memory 121, the display screen 194, the camera 193, the wireless communication module 160, and the like.

The power management module 141 may be configured to monitor performance parameters such as a battery capacity, a battery cycle count, a battery charging voltage, a battery discharging voltage, a battery state of health (such as electric leakage and impedance). In some other embodiments, the power management module 141 may be alternatively disposed in the processor 110. In some other embodiments, the power management module 141 and the charging management module 140 may be alternatively disposed in the same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the electronic device 100. The mobile communication module 150 may include one or more filters, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in the same device.

The wireless communication module 160 may provide a solution to wireless communication applied to the electronic device 100, including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more devices integrating one or more communication processing modules. The wireless communication module 160 receives an electromagnetic wave through the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), and a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display screen 194, the AP, and the like. The GPU is a microprocessor for image processing, and is connected to the display screen 194 and the AP. The GPU is configured to perform mathematical and geometric calculations, and is configured to render graphics. The processor 110 may include one or more GPUs, and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device 100 may include one or N display screens 194, and N is a positive integer greater than 1.

The electronic device 100 may implement a photographing function by using the ISP, the camera 193, the video codec, the GPU, the display screen 194, the AP, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may alternatively perform algorithm optimization on noise, luminance, and complexion of the image. The ISP may alternatively optimize parameters such as exposure and a color temperature of a photographing scene. In some embodiments, the ISP may be disposed in the camera 193.

The camera 193 is configured to capture a static image or a video. In some embodiments, the mobile phone 100 may include one or N cameras, and N is a positive integer greater than 1. The camera 193 may be a front-facing camera, or may be a rear-facing camera. The camera 193 generally includes a lens and a photosensitive element (sensor). The photosensitive element may be any photosensitive device such as a charge-coupled device (charge-coupled device, CCD) or a complementary metal oxide semiconductor (complementary metal oxide semiconductor, CMOS).

The digital signal processor is configured to process a digital signal, and may further process another digital signal in addition to a digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The external memory interface 120 may be configured to connect to an external storage card, for example, a micro SD card, to expand a storage capability of the electronic device 100. The external storage card communicates with the processor 110 by using the external memory interface 120, to implement a data storage function, such as storing a file such as a music or a video in the external storage card.

The internal memory 121 may be configured to store one or more computer programs, and the one or more computer programs include instructions. The processor 110 may run the foregoing instructions stored in the internal memory 121, so that the electronic device 100 performs the method provided in some embodiments of this application, and various functional applications and data processing. The internal memory 121 may include a program storage region and a data storage region. The program storage region may store the operating system, and may further store one or more applications (such as a gallery and a contact), and the like. The data storage region may store data (such as a picture and a contact) and the like created when the electronic device 100 is used. In addition, the internal memory 121 may include a high-speed random access memory, and may further include a non-volatile memory such as one or more magnetic disk storage devices, a flash memory, or a universal flash storage (universal flash storage, UFS). In some other embodiments, the processor 110 runs the instructions stored in the internal memory 121 and/or the instructions stored in the memory disposed in the processor, so that the electronic device 100 performs the method provided in the embodiments of this application, and various functional applications and data processing.

The electronic device 100 may implement an audio function such as music playing or recording by using the audio module 170, the speaker 170A, the telephone receiver 170B, the microphone 170C, the headset jack 170D, the AP, and the like.

The audio module 170 is configured to convert digital audio information into an analog audio signal for outputting, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. Music may be listened to or a hands-free call may be answered by using the speaker 170A in the electronic device 100.

The telephone receiver 170B, also referred to as a "receiver", is configured to convert an audio electrical signal into a sound signal. When the electronic device 100 is configured to answer a call or receive voice information, the telephone receiver 170B may be put close to a human ear to receive a voice.

The microphone 170C, also referred to as a "mouthpiece" or a "megaphone", is configured to convert a sound signal into an electrical signal. When making a call or sending voice information, a user may make a sound approaching the microphone 170C through the mouth of the user, to input a sound signal into the microphone 170C. One or more microphones 170C may be disposed in the electronic device 100. In some other embodiments, two microphones 170C may be disposed in the electronic device 100, to collect a sound signal and also implement a noise reduction function.

In some other embodiments, three, four, or more microphones 170C may be alternatively disposed in the electronic device 100, to implement sound signal collection and noise reduction, also recognize a sound source, and implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface, or cellular telecommunications industry association of the USA (cellular telecommunications industry association of the USA, CTIA) standard interface.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor, and the like. This is not limited in this embodiment of this application.

Certainly, the electronic device 100 provided in the embodiments of this application may further include one or more devices such as a button 190, a motor 191, an indicator 192, and a SIM card interface 195. This is not limited in this embodiment of this application.

A software system of the electronic device 100 may use a layered architecture, an event-driven architecture, a microkernel architecture, a micro service architecture, or a cloud architecture. In this embodiment of this application, the software structure of the electronic device 100 is exemplarily described by using an Android system with a layered architecture as an example.

Figure 2:
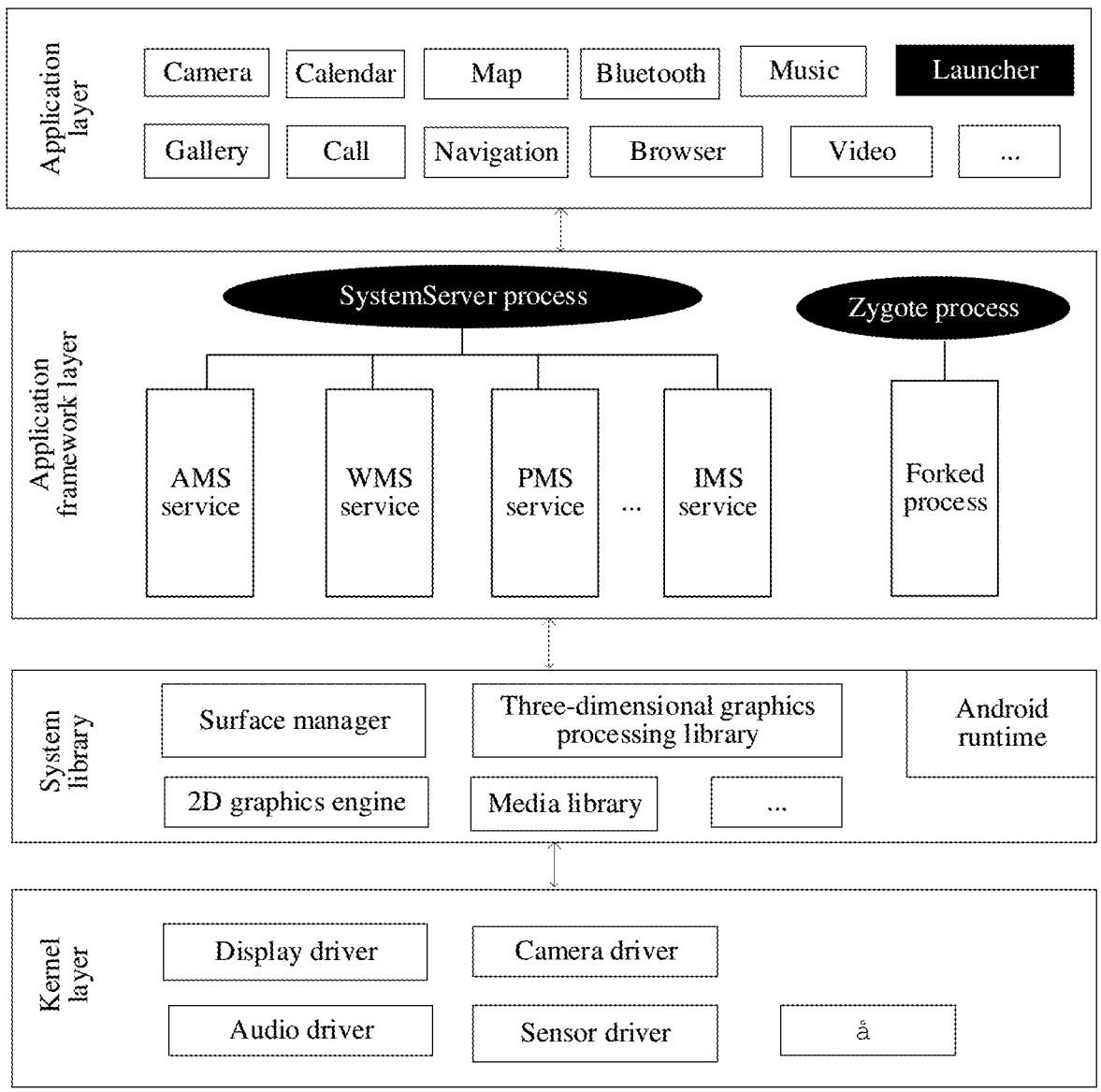
FIG. 2 is a schematic architectural diagram of an operating system of an electronic device according to an embodiment of this application.

FIG. 2 is a block diagram of a software structure of an electronic device 100 according to an embodiment of this application.

In the layered architecture, software is divided into several layers, and each layer has a clear role and task. Layers communicate with each other through a software interface. In some embodiments, the Android system is divided into four layers that are respectively an application layer, an application framework layer, an Android runtime and system library, and a kernel layer from top to bottom.

As shown in FIG. 2, the application layer may include a series of applications. For example, applications (APPs) such as call, memo, browser, contacts, camera, gallery, calendar, map, Bluetooth, music, video, and short message may be installed in the application layer.

The APPs are generally written in a java language, and each APP includes one or more class files. Each APP may run respective class files in the application layer in the form of a process. When the user operates in the APP, the APP may interact with the system library or the kernel layer by invoking a relevant API or a service in the application framework layer, to implement a function corresponding to this operation.

In addition, the application layer further includes Android core applications such as a launcher (a launcher may include components such as a desktop). Generally, after the Android system starts, the launcher may be run in the Android system for a long time as resident core application. A start icon of an application is generally disposed in the launcher. The launcher may monitor an operation that the user clicks on a start icon of an application, and generate a start message of the application, send the start message to related services in the application framework layer, and an application process of the application is started by using the services.

The application framework layer provides an application programming interface (application programming interface, API) and a programming framework for the applications at the application layer. The application framework layer includes some predefined functions.

As shown in FIG. 2, a SystemServer process and a Zygote process are run in the application framework layer.

The SystemServer process may provide almost all system services to the APPs in the application layer. For example, the system services may include an activity manager service (activity manager service, AMS), a power manager service (power manager service, PMS), a window manager service (window manager service, WMS), a network management service (network management service, NMS), an input manager service (input manager service, IMS), and the like. The system services may reside in the SystemServer process in the form of threads.

The Zygote process is a very important daemon process service in the Android system, and almost all application processes are forked by using the Zygote process. Because the applications are written in the Java language, each application needs to run in a respective independent virtual machine (dalvik) in the form of a process. When an application starts, a virtual machine of the application may be forked by using the Zygote process, and a memory of the virtual machine and various services provided in the SystemServer process may be further shared.

Generally, after detecting that the user clicks on a start icon of an application (such as a gallery APP), the launcher may send a start message of the application to the SystemServer process. If an application process of the application does not exist in current application processes, indicating that an application process needs to be recreated for the application now, the SystemServer process may invoke the activity manager service (AMS) to communicate with the Zygote process, and request the Zygote process to create a corresponding application process for the application, to implement a cold start of the application.

The gallery APP is used as an example. After detecting that the user clicks on the start icon of the gallery APP, the launcher may send the start message of the gallery APP to the SystemServer process. If the application process of the gallery APP does not exist in the current application processes, the SystemServer process may invoke the AMS by using a socket to send a creation request for the application process to the Zygote process. After receiving the creation request, the Zygote process may create an application process 1 of the gallery APP in response to the creation request. The application process 1 generally includes a main thread (ActivityThread) of the application. To start to normally run code in the gallery APP, after the application process 1 of the gallery APP is created, the main thread of the application needs to be first initialized, and class files of the gallery APP are loaded into a memory.

The main thread may complete the initialization of the main thread by executing a main function of ActivityThread. By initializing the main thread of the application, a virtual machine environment in which the gallery APP can run may be built, the application process 1 of the gallery APP may be registered in the AMS, various types of directories may be created when the gallery APP runs, and a message distribution mechanism for various services in the SystemServer process may be created when the gallery APP runs.

In addition, the class files in the gallery APP are stored in a ROM (read-only memory, read-only memory) of the electronic device before the application starts. When the gallery APP starts, the class files in the gallery APP further need to be loaded into a RAM (random-access memory, running memory) of the electronic device. In this case, a class loader of the application process 1 needs to be first created, and a corresponding class file is further loaded into the RAM of the electronic device by using the class loader. Alternatively, the class files in the gallery APP may be alternatively stored in the ROM in the form of a class library. One class library may be a set of one or more class files. In this case, the loading the class file into the RAM by using the class loader may be loading the class file in the class library into the RAM.

For example, a time consumed for initializing the main thread is T1, and a time consumed for creating the class loader to load the class file is T2. In the related art, when the gallery APP starts, the initialization of the main thread is executed in series, and the class loader is created in series to load the class file. Therefore, a start time T of the gallery APP includes T1+T2.

Figure 3:
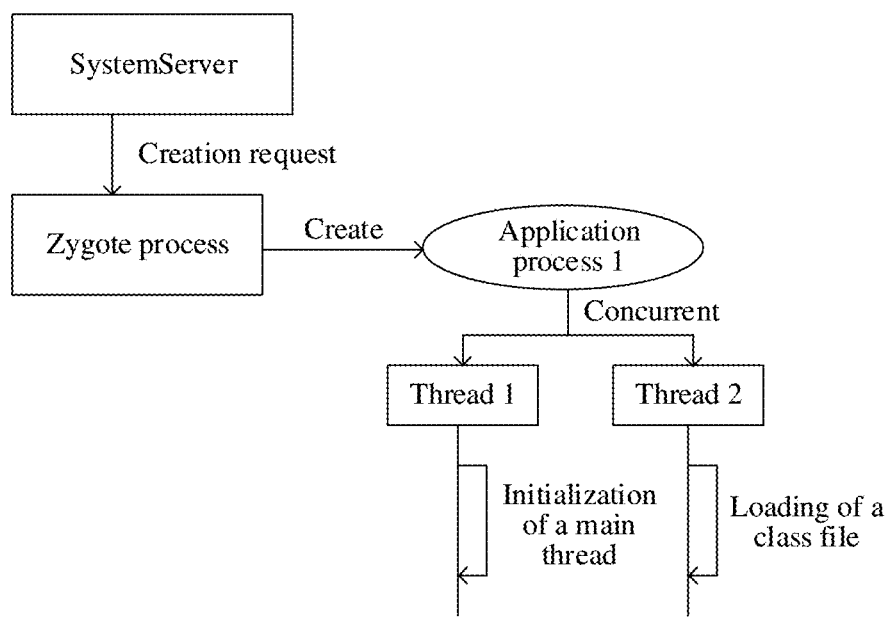
FIG. 3 is a schematic flowchart 1 of an application start method according to an embodiment of this application.

In this embodiment of this application, to shorten the start time when the application starts, as shown in FIG. 3, after the Zygote process creates an application process of a to-be-started application (for example, the application process 1 of the gallery APP), the application process 1 may complete, in a multithreaded parallel manner, the work of initializing the main thread and loading the class file. In this way, the class loader of the application may be created to load the class file while the main thread of the application is initialized, to shorten a start time consumed when an application is cold-started, thereby improving the use experience when a user opens the application.

As shown in FIG. 2, the system library may include a plurality of functional modules, such as a surface manager, a media library, a three-dimensional graphics processing library (for example, OpenGL ES), and a 2D graphics engine (for example, SGL).

The surface manager is configured to manage a display subsystem, and provide fusion of 2D and 3D layers to a plurality of applications. The media library supports playback and recording in a plurality of common audio and video formats, a static image file, and the like. The media library may support a plurality of audio and video encoding formats such as MPEG4, H.264, MP3, AAC, AMR, JPG, and PNG. The three-dimensional graphics processing library is used to implement three-dimensional graphics drawing, image rendering, synthesis, layer processing, and the like. The 2D graphics engine is a drawing engine for 2D drawings.

The Android Runtime includes a core library and a virtual machine. The Android runtime is responsible for scheduling and managing the Android system.

The core library includes two parts: One part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The kernel layer is a layer between hardware and software. The kernel layer includes at least a display driver, a camera driver, an audio driver, and a sensor driver. This is not limited in this embodiment of this application.

An application start method provided in the embodiments of this application is described below in detail with reference to the accompanying drawings.

Figure 4:
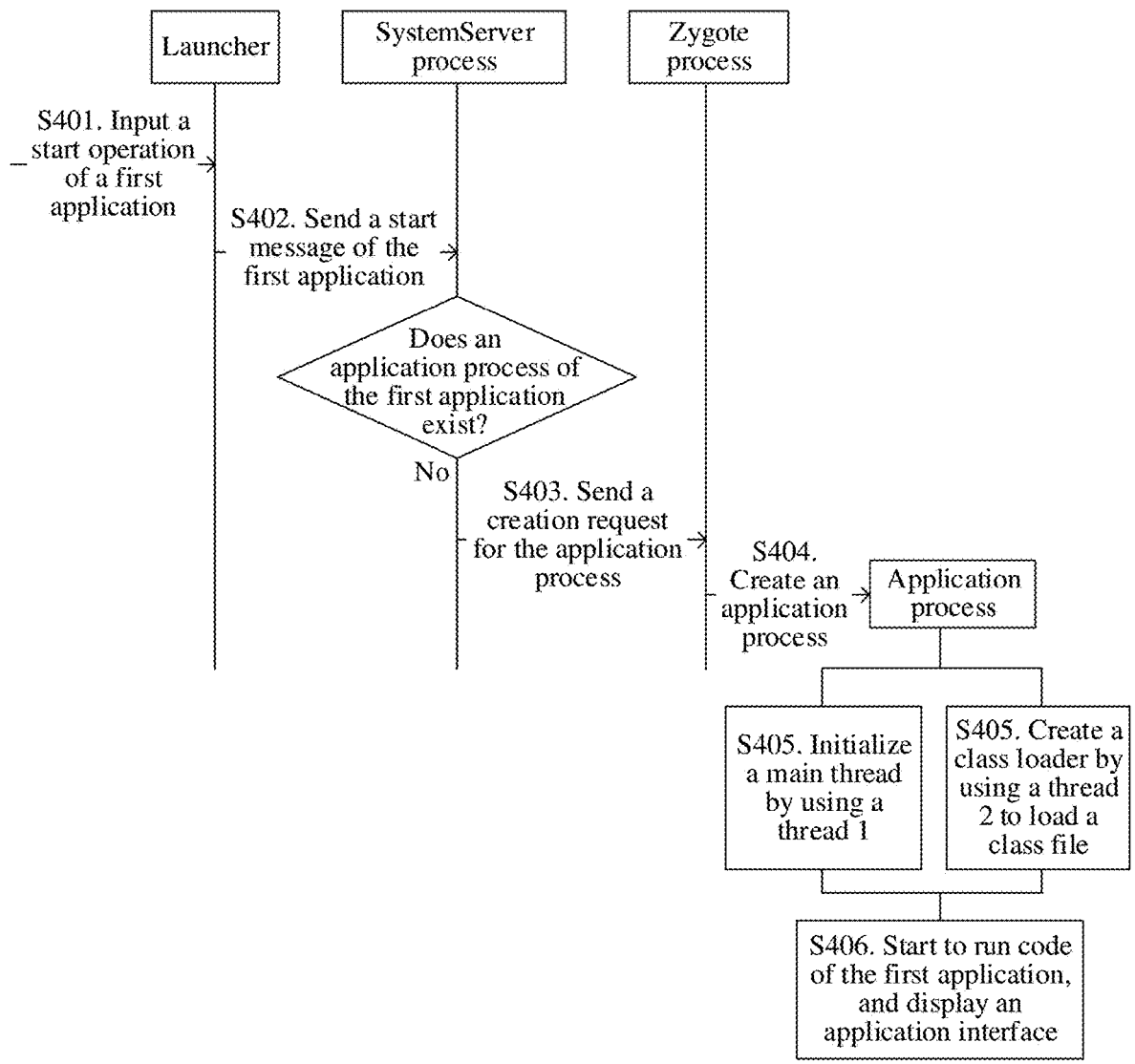
FIG. 4 is a schematic flowchart 2 of an application start method according to an embodiment of this application.

For example, as shown in FIG. 4, for example, a mobile phone is an electronic device. An embodiment of this application provides an application start method including the following steps:

S401. A mobile phone detects a start operation that a user opens a first application.

S402. A launcher in the mobile phone sends a start message of the first application to a SystemServer process in response to the start operation.

Figure 5:
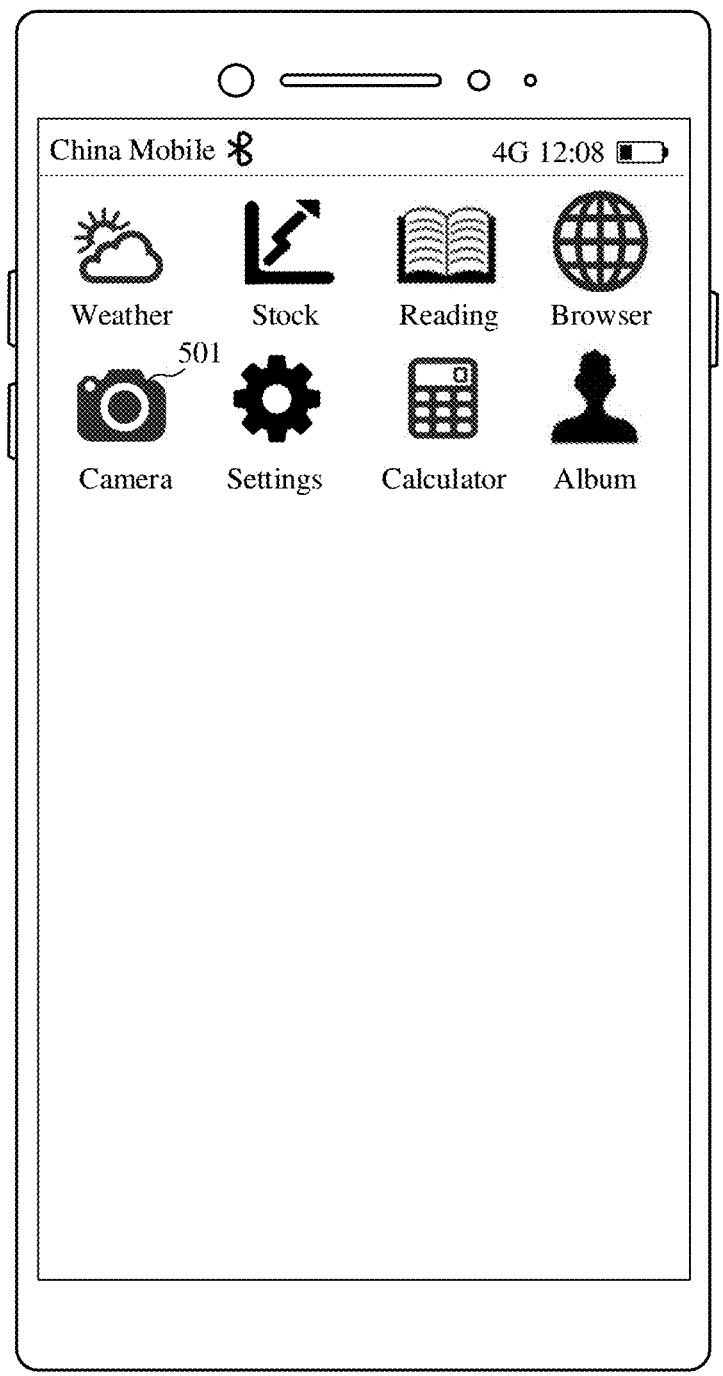
FIG. 5 is a schematic diagram 1 of an application scenario of an application start method according to an embodiment of this application.

For example, after the mobile phone is turned on, the launcher may be automatically run on the application layer as a resident application. As shown in FIG. 5, the mobile phone may display start icons of applications that have been installed in the launcher. When the user needs to open an application, the user may input a start operation of clicking on a corresponding start icon into the launcher, and the launcher may monitor the start operation that the user clicks on a start icon.

For example, the user clicks on a start icon 501 of a camera APP in FIG. 5. After the launcher detects this start operation that the user clicks on the start icon 501, indicating that the user intends to open the camera APP, the launcher may interact with a SystemServer process in the mobile phone, and send a start message of the first application to the SystemServer process. For example, the launcher may send the start message of the camera APP to the SystemServer process by invoking a start_activity interface. The start message may include information such as a package name of the camera APP.

It should be noted that the foregoing embodiment is described by using an example in which the user opens a first application from a mobile phone desktop. It may be understood that, the user may open the first application through other entrances in the mobile phone. For example, the user may open the first application in a lock screen interface, a minus-one screen menu, a drop-down menu, or a pull-up menu. In another example, the user may alternatively open the first application in applications being running to be jumped to another application. This is not limited in this embodiment of this application.

S403. If an application process of the first application does not exist in the mobile phone, the SystemServer process in the mobile phone sends a creation request for the application process to a Zygote process, where the creation request includes application information of the first application.

An example in which the camera APP starts is still used. After receiving the start message of the camera APP, the SystemServer process in the mobile phone may invoke the activity manager service (AMS) to query whether the application processes being running includes an application process of the camera APP. If the application process of the camera APP is included, indicating that the mobile phone does not kill the application process of the camera APP when the user exits the camera APP last time, the SystemServer process may switch, in a hot start manner, the application process of the camera APP to a foreground of the mobile phone to continue to be run. The hot start manner of this application generally takes a relatively short time.

Correspondingly, if the application process of the camera APP does not exist in the application processes being running, the SystemServer process needs to recreate an application process of the camera APP in a cold start manner, so that the application process of the camera APP can start to run code of the camera APP and display a corresponding application interface. In this case, the SystemServer process may invoke the AMS to send a creation request for a WeChat application process to the Zygote process. For example, the SystemServer process may communicate with the Zygote process in a socket manner.

The creation request sent by the SystemServer process to the Zygote process carries application information (application info) of the first application. The application information may include a package name of the first application, an application permission of the first application, class file names included in the first application, one or more class loaders required for class files, a dependency relationship between the class loaders, and the like. Subsequently, the Zygote process may create, by using the application information, an application process that may correctly run code of the first application.

Generally, an APK (Android application package) file of the application is provided with a configuration file, and the configuration file includes application information of an application. When an application is installed on the mobile phone, the SystemServer process may create a corresponding directory for the application, and store application information of the application in the created directory. In this way, the SystemServer process may subsequently obtain application information of each application from a corresponding directory. For example, after receiving the start message of the camera APP, the SystemServer process may obtain application information of the camera APP from a directory preset for the camera APP, and send a creation request for the application process carrying the application information to the Zygote process.

Because the application information of the first application records one or more class loaders required for the first application, after creating an application process for the first application in response to the creation request for the first application, the Zygote process may transmit the application information carried in the creation request to the application process of the first application. Subsequently, the application process of the first application may further create a corresponding class loader according to the application information to load a class file while initializing the main thread. In this way, when the first application starts, the application process may create the corresponding class loader in parallel to load the class file without waiting for the completion of the initialization of the main thread, thereby shortening the start time when the application is cold-started.

S404. The Zygote process in the mobile phone creates an application process of the first application in response to the creation request.

For example, after receiving the creation request for the WeChat application process sent by the SystemServer process, the Zygote process may create an application process A of the camera APP in response to the creation request. For example, the Zygote process may allocate a memory space to the application process A of the camera APP by using a fork function, and allocate a process ID to the application process A of the camera APP. The Zygote process may return the process ID allocated to the application process A to the SystemServer process, so that the SystemServer process learns, according to the process ID, that the application process A of the camera APP has been created.

S405. The application process of the first application executes a thread 1 and a thread 2 in parallel, where the thread 1 is configured to initialize a main thread of the first application, and the thread 2 is configured to create a class loader according to the application information to load a class file of the first application.

Generally, the application process A created by the Zygote process for the camera APP includes a main thread (ActivityThread) of the application. The main thread is used as a starting point of the application process A, and other threads in the application process A are all started by the main thread. Before running the code of the camera APP, the application process A of the camera APP further needs to initialize ActivityThread in the application process A, and load the class files of the camera APP into a memory allocated by the Zygote process to the application process A, to build a virtual machine environment for the application process A that can normally run the class files of the camera APP. Otherwise, the application process A of the camera APP cannot start to execute the code of the camera APP, that is, the class files in the camera APP.

Figure 6:
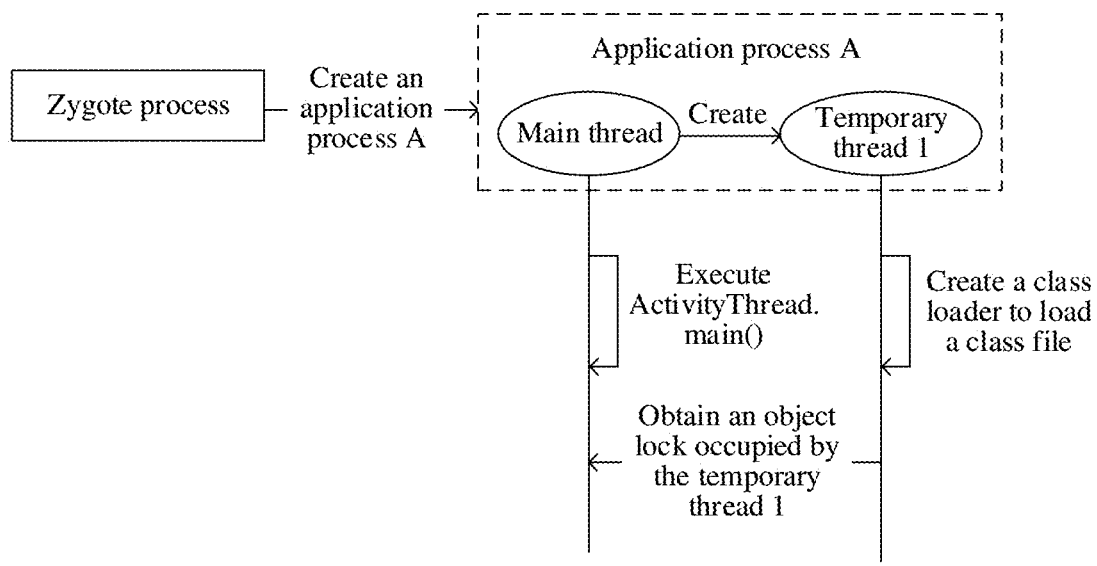
FIG. 6 is a schematic flowchart 3 of an application start method according to an embodiment of this application.

In this embodiment of this application, as shown in FIG. 6, after the Zygote process creates the application process A for the camera APP, the main thread in the application process A may create a temporary thread 1, and transmit the application information of the camera APP in the creation request to the temporary thread 1. Further, the application process A may complete the initialization of the main thread by executing the main function of ActivityThread by using the main thread. In addition, the application process A may create class loaders of the camera APP according to the application information of the camera APP by using the temporary thread 1, and load the class files of the camera APP into the memory by using the class loaders. That is, the application process A may complete, in parallel in a multi-threaded manner, the steps of initializing the main thread and loading the class file, thereby shortening the start time when the application is cold-started.

On one hand, the main function of ActivityThread is used for initializing the main thread. The main thread may create, by executing the main function of ActivityThread, a file directory required when the application process A runs, register the application process A in the AMS of the SystemServer process, and create a message distribution mechanism when the application process A being running interacts with various services in the SystemServer process. After the main thread is initialized, a virtual machine environment may be built for the camera APP when the application process A runs.

On the other hand, the temporary thread 1 may create, according to the application information of the camera APP by executing a Create ClassLoader function, class loaders recorded in the application information, and load, by using the class loaders, the class files in the camera APP into the memory allocated to the application process A. In this way, the application process A can start to run the class files of the camera APP in the memory. For example, when creating the application process A, the Zygote process may transmit the application information in the creation request sent by the SystemServer process to the main thread of the application process A. The application information records the one or more class loaders required for the class files of the camera APP. For example, the application information records an identification of a class loader 1, and it indicates that the camera APP needs to use the class loader 1 to load a class file when running the class file.

Then, when creating a temporary thread 1, the main thread of the application process A may transmit the identification of the class loader 1 as an input parameter to the temporary thread 1. In this way, the temporary thread 1 may create the class loader 1 according to the identification of the class loader 1, and load, by using the class loader 1, the class files of the camera APP into the memory occupied by the application process A.

In some embodiments, the application information of the camera APP may record identifications of a plurality of class loaders, for example, identifications of the class loader 1 and the class loader 2, and it indicates that the camera APP needs to use the class loader 1 and the class loader 2 to load different class files when being running.

Figure 7:
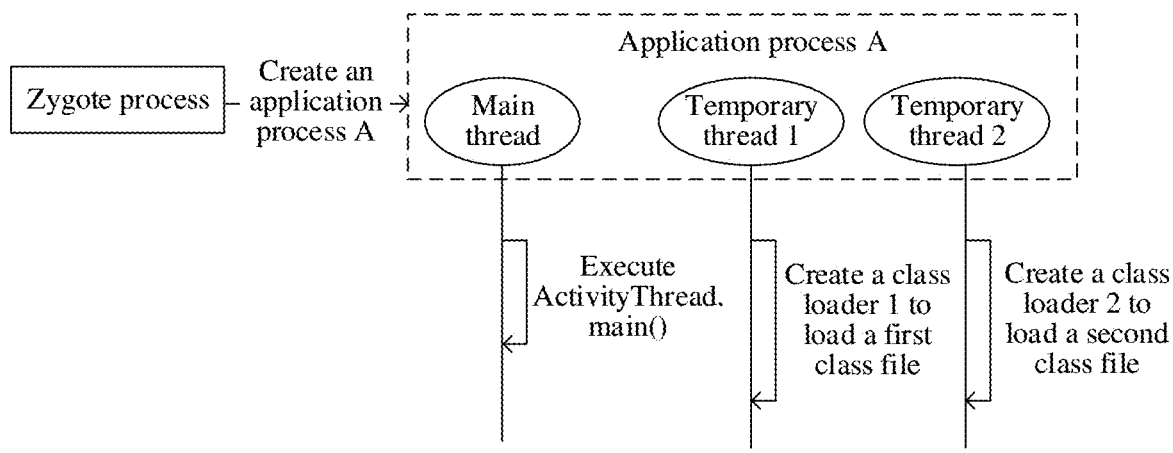
FIG. 7 is a schematic flowchart 4 of an application start method according to an embodiment of this application.

In this case, similar to the threads in parallel shown in FIG. 6, as shown in FIG. 7, after the Zygote process creates the application process A for the camera APP, the main thread in the application process A may create a temporary thread 1 and a temporary thread 2. In addition, the main thread of the application process A may transmit the identification of the class loader 1 as the input parameter to the temporary thread 1, and also transmit the identification of the class loader 2 as an input parameter to the temporary thread 2. In this way, the temporary thread 1 may create a class loader 1 according to the identification of the class loader 1, and load, by using the class loader 1, a first class file (there may be one or more first class files) of the camera APP into the memory occupied by the application process A. In addition, the temporary thread 2 may create a class loader 2 according to the identification of the class loader 2, and load, by using the class loader 2, a second class file (there may be one or more second class files) of the camera APP into the memory occupied by the application process A. That is, if the plurality of class loaders are required when the application starts, the application process may load the class files while creating the plurality of class loaders in parallel a multithreaded manner, thereby shortening the start time when the application is cold-started.

In some other embodiments, the application information of the camera APP may further record a dependency relationship between the plurality of class loaders. That is, the plurality of class loaders are required when the camera APP runs, and there is a dependency relationship between the plurality of class loaders. For example, the application information of the camera APP may record identifications of the class loader 1, the class loader 2, and a class loader 3, and it is declared that the class loader 3 depends on the class loader 1 and the class loader 2. That is, a process of creating the class loader 3 depends on creation results of the class loader 1 and the class loader 2, and the class loader 3 may be successfully created only after the loader 1 and the class loader 2 are successfully created.

Figure 8:
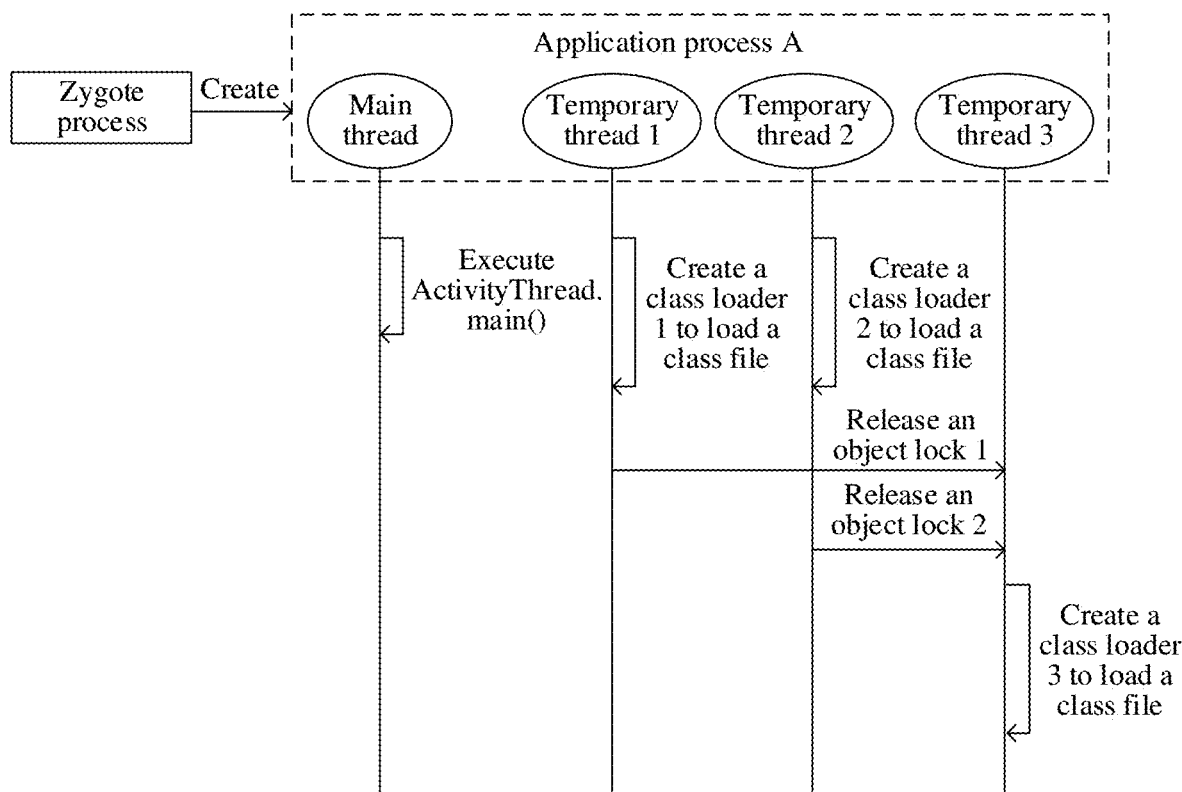
FIG. 8 is a schematic flowchart 5 of an application start method according to an embodiment of this application.

In this way, the process of creating the class loader 3 cannot be executed in parallel with processes of creating the loader 1 and the class loader 2. In this case, as shown in FIG. 8, after the Zygote process creates the application process A for the camera APP, the main thread in the application process A may create a temporary thread 1, a temporary thread 2, and a temporary thread 3. In addition, the main thread of the application process A may transmit the identification of the class loader 1 as the input parameter to the temporary thread 1, the identification of the class loader 2 as the input parameter to the temporary thread 2, and an identification of the class loader 3 as an input parameter to the temporary thread 3.

A difference is that still as shown in FIG. 8, the temporary thread 1 may occupy an object lock 1 when being running. After creating the class loader 1 according to the identification of the class loader 1 and completing the loading of the corresponding class file, the temporary thread 1 may release the occupied object lock 1. In this case, the temporary thread 3 can obtain a running result of the object lock 1 accessing the temporary thread 1. Similarly, the temporary thread 2 may occupy an object lock 2 when being running. When creating the class loader 2 according to the identification of the class loader 2 and completing the loading of the corresponding class file, the temporary thread 2 may release the occupied object lock 2. In this case, the temporary thread 3 can obtain a running result of the object lock 2 accessing the temporary thread 2. In this case, after the temporary thread 3 obtains the object lock 1 and the object lock 2, the temporary thread 3 may create the class loader 3 corresponding to the identification of the class loader 3 according to the running results of the temporary thread 1 and the temporary thread 2, and complete the loading of the corresponding class file by using the class loader 3.

That is, if the plurality of class loaders that are required when the application starts already have a dependency relationship, the application process may first create in parallel in a multithreaded manner class loaders that have no dependency relationship to load the class files. Compared with a mode in which each class loader is created in a serial manner to load the class file, this mode can also shorten the start time when the application is cold-started.

In addition, the foregoing embodiment is described by using an example in which the main thread creates N class loaders in parallel by creating N (N is an integer greater than 1) temporary threads, where each temporary thread is configured to create one class loader. It may be understood that, the main thread may alternatively create the N class loaders in parallel by creating M (M<N) temporary threads. In this case, one temporary thread may create a plurality of class loaders in series.

Figure 9:
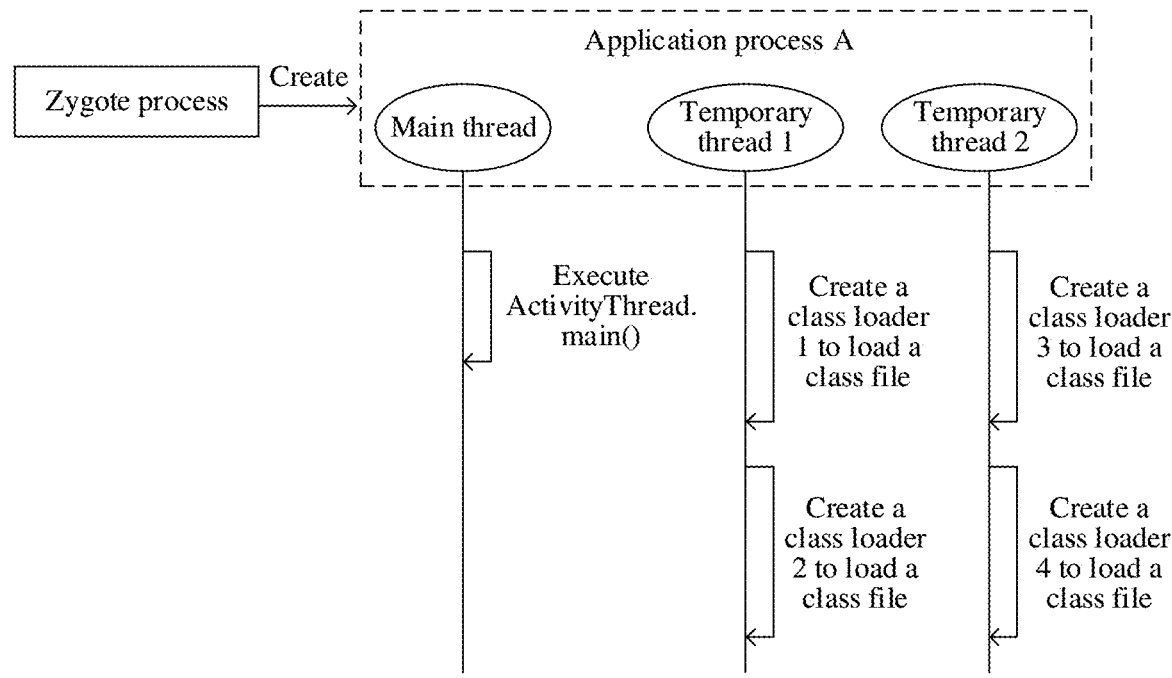
FIG. 9 is a schematic flowchart 6 of an application start method according to an embodiment of this application.

For example, if the camera APP requires the class loader 1 to the class loader 4 when being running and there is no dependency relationship between the four class loaders, as shown in FIG. 9, after the Zygote process creates an application process A for the camera APP, a main thread in the application process A may create a temporary thread 1 and a temporary thread 2. The temporary thread 1 may be configured to create a class loader 1 and a class loader 2, and complete loading of corresponding class files by using the class loader 1 and the class loader 2; and the temporary thread 2 may be configured to create a class loader 3 and a class loader 4, and complete loading of corresponding class files by using the class loader 3 and the class loader 4. In this way, although each temporary thread creates a class loader in a serial manner to load a class file when being running, a plurality of temporary threads may be run in a parallel manner, which can also shorten the start time when the application is cold-started.

When the main thread of the application process A completes initialization of the main thread by executing a main function of ActivityThread, and the application process A can start to execute the class files of the camera APP to start the camera APP only after the temporary processes of the application process A complete the loading of the class files by creating the class loaders. Then, after the main thread completes the execution of the main function of ActivityThread, the main thread may query whether the temporary threads complete the loading of the class files.

The temporary thread 1 shown in FIG. 6 is still used as an example. After completing the execution of the main function of ActivityThread, the main thread may attempt to obtain an object lock occupied by the temporary thread 1. Because the temporary thread 1 always occupies the object lock when creating the class loader 1 and loading the class file and the temporary thread 1 may release the object lock until after the class file is loaded, if the main thread obtains the object lock, indicating that the class files required for starting the camera APP this time have been successfully loaded, the application process A may continue to perform the following step S406.

Correspondingly, if the main thread cannot obtain the object lock occupied by the temporary thread 1, indicating that the class files required for starting the camera APP this time fail to be loaded, the main thread may wait, in a thread blocking manner, to obtain the object lock occupied by the temporary thread 1. After the temporary thread 1 completes the loading of the class file, the main thread may obtain the object lock released by the temporary thread 1, and further continue to perform the following step S406.

S406. The application process of the first application starts to run code of the first application, and displays an application interface of the first application.

Figure 10:
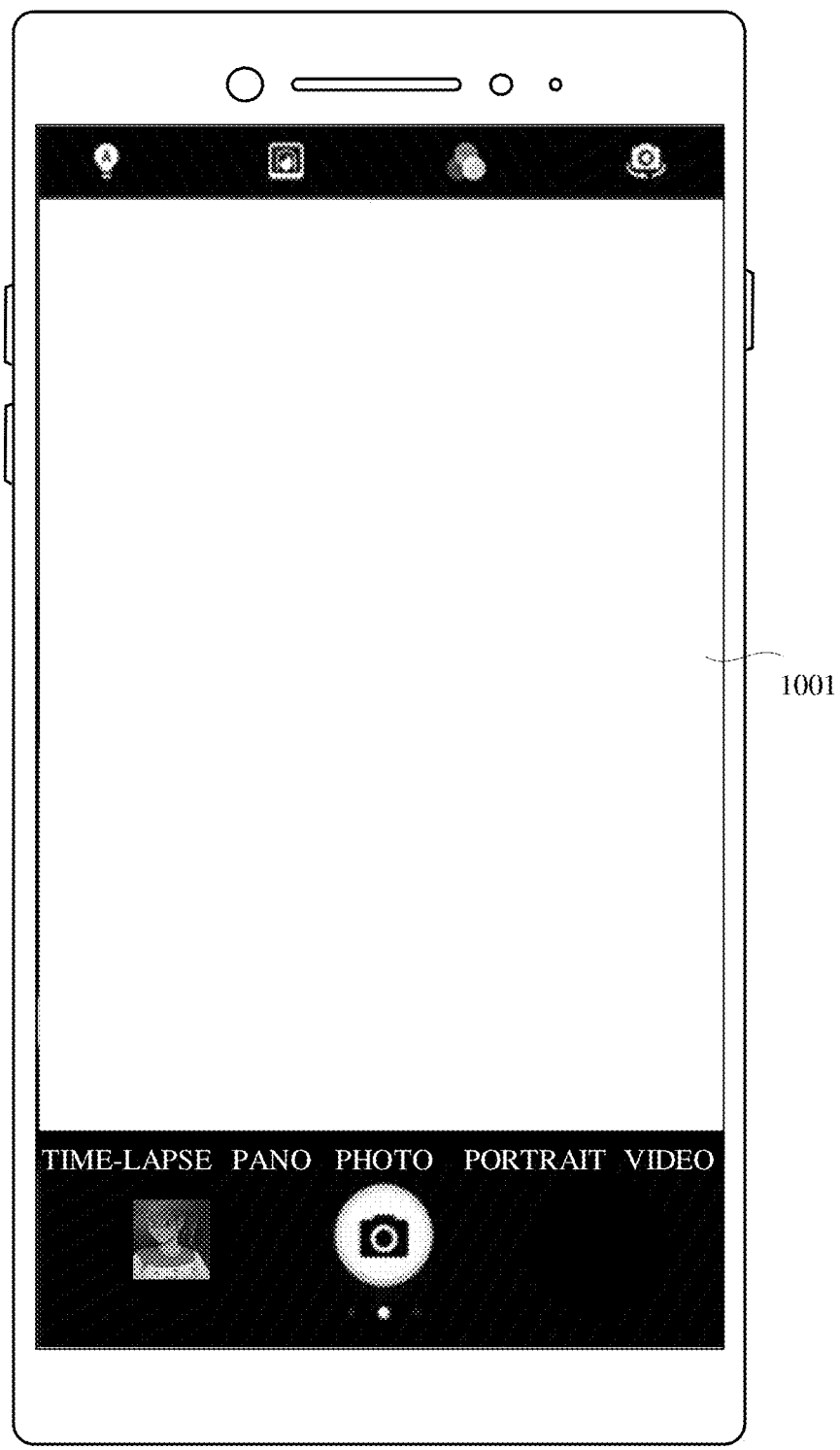
FIG. 10 is a schematic diagram 2 of an application scenario of an application start method according to an embodiment of this application.

The application process A of the camera APP is still used as an example. After completing the initialization of the main thread and the loading of the class file in a multi-threaded parallel manner, the application process A may start to run the code of the camera APP (that is, the class files of the camera APP) in the memory allocated by the Zygote process to the application process A. In this case, as shown in FIG. 10, the mobile phone may display an application interface 1001 of the camera APP, so that the user learns that the mobile phone has started the camera APP.

Certainly, before the application process A starts to run the code of the camera APP, to reduce the time for which the user waits for the camera APP to start, the mobile phone may further display content such as a preset picture, animation, or advertisement to the user. This is not limited in this embodiment of this application.

It can be learned that in this embodiment of this application, when creating an application process of a to-be-started application in a cold start manner, the mobile phone may complete, in a multithreaded parallel manner, the work of initializing the main thread and loading the class file. In this way, the start time from the moment at which the user opens the application to the moment at which the mobile phone starts to run the code of the application can be shortened, thereby improving the use experience when a user opens the application.

In some other embodiments, when starting the application, the mobile phone may further send a start message of the application to the SystemServer process in other manners in addition to sending the start message of the application to the SystemServer process by using the launcher. For example, when starting an application, the mobile phone may send the start message of the application to the SystemServer process by using a system broadcast in the Android system. In another example, when starting an application, the mobile phone may send the start message of the application to the SystemServer process by using a binder message mechanism.

Generally, after receiving a start message of an application, the SystemServer process needs to first verify the start message, to determine whether to allow to start a related application in response to the start message, thereby preventing the malicious start of some applications, to avoid increasing the power consumption of the mobile phone and avoid affecting the use experience of the user. For example, the user may set a whitelist or a blacklist for the application start in settings of the mobile phone or a mobile phone manager application, for example, a whitelist of applications that are allowed to be automatically started in a background or a blacklist of applications that are forbidden to be automatically started during power on. Then, after the SystemServer process receives a start message of an application, the SystemServer process may determine, in combination with a current scenario (such as a power-on scenario or a background scenario), whether the to-be-started application is an application in the whitelist or the blacklist set by the user. If the application is an application in the whitelist, the SystemServer process may allow the application to start, that is, the start message is successfully verified. If the application is an application in the blacklist, the SystemServer process may forbid the application to start, that is, the start message fails to be verified. In another example, after the SystemServer process receives a start message indicating that an application starts another application, the SystemServer process may verify the start message according to an application type. For example, if it is detected that an application A sends a start message of an advertisement type application by using a binder service, the SystemServer process may forbid the application to start, that is, the start message fails to be verified; and if it is detected that the application A sends a start message of a payment type application by using the binder service, the SystemServer process may allow the application to start, that is, the start message is successfully verified.

However, the start message of the application sent by the launcher to the SystemServer process is generally generated in response to the start operation when the user opens the application. Therefore, the SystemServer process generally allows the application to start for a verification result of the start message sent by the launcher, that is, the start message is successfully verified.

Figure 11:
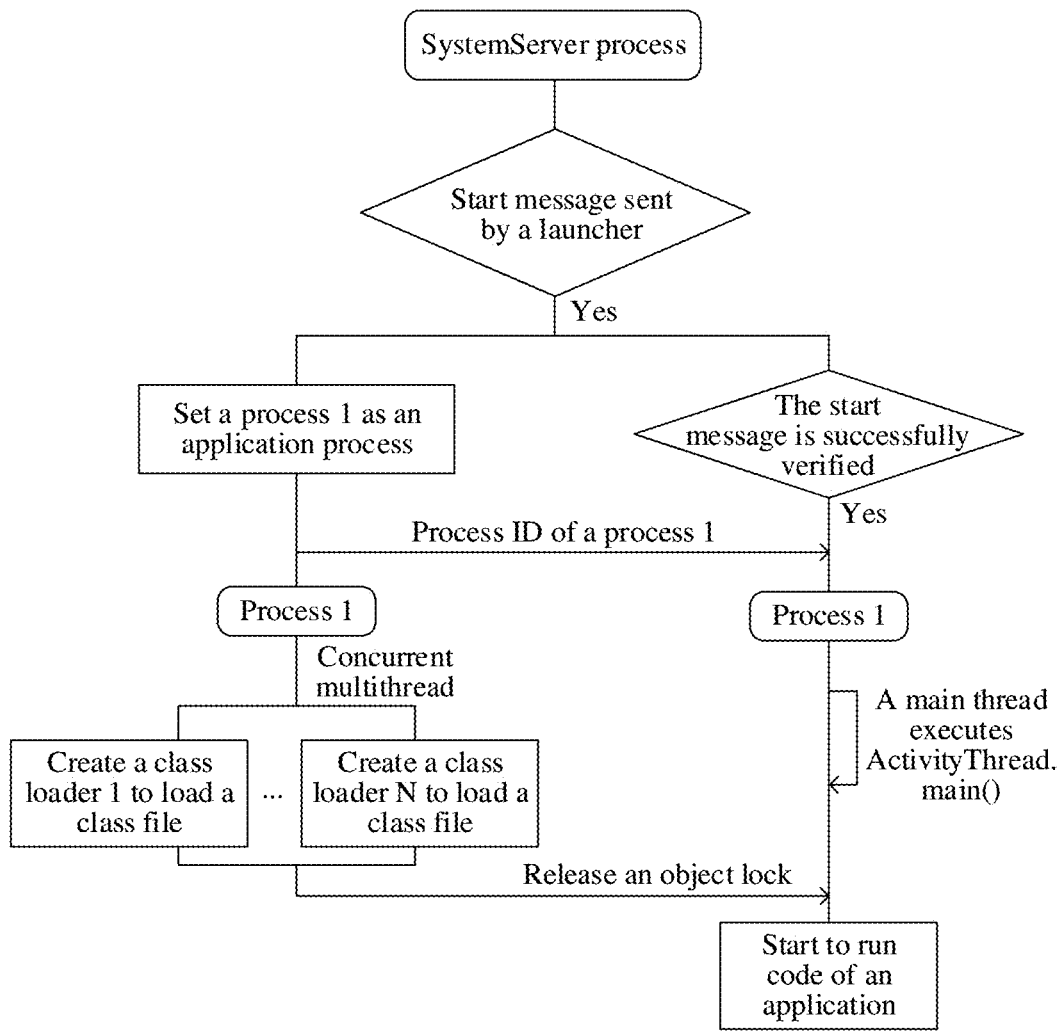
FIG. 11 is a schematic flowchart 7 of an application start method according to an embodiment of this application.

Then, in this embodiment of this application, as shown in FIG. 11, after the SystemServer process receives the start message sent by the launcher, the SystemServer process may directly invoke a process in a preset process pool to create a class loader required for starting the application. That is, after the SystemServer process receives the start message sent by the launcher, because the start message is very likely to trigger the SystemServer process to subsequently start an application, the SystemServer process may pre-create a class loader required when the application starts, thereby shortening the start time when the application is cold-started.

For example, the SystemServer process may pre-create a process pool by using the Zygote process. The process pool may include one or more processes. The one or more processes have no specific ownership, but each process has a respective process ID and a memory space. For example, the launcher sends a start message of the camera APP to the SystemServer process. After receiving the start message, the SystemServer process may select one process (for example, a process 1) from the process pool as an application process of the camera APP, and store a process ID of the process 1. Further, the SystemServer process may transmit application information of the camera APP to the process 1, and the process 1 creates, according to the related method in the foregoing step S405, one or more class loaders that need to be used when the camera APP runs, and loads the class files of the camera APP by using the created class loaders.

For example, the process 1 may create, in a multithreaded parallel manner, a plurality of class loaders that need to be used when the camera APP runs, and load, by using the class loaders, the class files of the camera APP into the memory occupied by the process 1.

Still as shown in FIG. 11, after receiving the start message sent by the launcher, the SystemServer process may further verify the start message according to an existing verification procedure. After the verification succeeds, because the SystemServer process has allocated the ID of the process 1 as an ID of the application process of the camera APP, the SystemServer process may continue to invoke the process 1 to complete the initialization of a main thread in the process 1. For example, the main thread in the process 1 may complete, by executing a main function of ActivityThread, the process of initializing the main thread.

After the main thread of the process 1 completes the execution of the main function of ActivityThread, the main thread may query the process 1 whether the class files required for starting the camera APP this time have been successfully loaded. If the class files have been successfully loaded, the process 1 may be used as the application process of the camera APP and starts to run code of the camera APP, so that the mobile phone displays an application interface of the camera APP.

Certainly, if the SystemServer process rejects the start message after receiving the start message sent by the launcher, that is, the verification fails, the SystemServer process may delete a class loader pre-created for the camera APP by using the process 1 and the loaded class files, to release the process 1 occupied in the process pool.

In addition, after the SystemServer process receives the start message sent by the launcher, if the preset process pool does not exist in the mobile phone or all the processes in the process pool are already occupied, the SystemServer process may further create the process 1 by using the Zygote process, and further complete, by using the newly created process 1, the process of starting the camera APP.

It can be learned that in the process of starting the camera APP, the SystemServer process may invoke, by using the start message sent by the launcher as a trigger condition, the process 1 in advance to create the class loaders that need to be used when the camera APP runs, and load the class files of the camera APP by using the class loaders. In this way, before the process used as the application process of the camera APP executes the code of the camera APP, the time consumed for initializing the main thread and loading the class file is reduced, thereby shortening the start time when the application starts.

It should be noted that in the foregoing embodiment, a scenario in which the application starts is used as an example to describe how to create a class loader in a multithreaded parallel manner to load a class file. It may be understood that, a person skilled in the art skilled may create a plurality of class loaders in parallel according to practical experience by using the foregoing method in another application scenario to load class files. This is not limited in this embodiment of this application.

The camera APP is still used as an example. When the application process A of the camera APP runs the code of the camera APP, if it is found that the mobile phone has downloaded a hot patch for the camera APP in a preset folder of the RAM, the application process A needs to load class files in the hot patch into the memory occupied by the application process A. In this case, the application process A may query a configuration file of the hot patch for one or more class loaders required for running the hot patch. If a plurality of class loaders are required, the application process A may create a plurality of temporary threads, and create the class loaders in parallel by using the temporary threads to load the class files in the hot patch, thereby shortening the time consumed for applying the hot patch to the camera APP.

In another example, when the software version of the camera APP needs to be updated, a new software version may be downloaded to the preset folder of the RAM in the mobile phone. Then, when the camera APP updates the software version online, the application process A of the camera APP needs to load class files in the new software version into the memory occupied by the application process A. In this case, if a plurality of class loaders are required for loading the class files in the new software version, the application process of the camera APP may create the plurality of class loaders in parallel in a multithreaded manner to load the class files in the new software version, thereby shortening the time consumed when the camera APP updates the software version.

For a specific method in which the application process creates a plurality of class loaders in parallel in a multi-threaded manner to load the class files, reference may be made to the related description of step S405 in the foregoing embodiment, and therefore details are not described herein again.

In addition, in addition to that various applications written in a Java language includes the class files, files written in other object-oriented languages may also include the class files. For example, files written in a C++ language, a Python language, and an Eiffel language may also include the class files. Then, the electronic device such as a mobile phone may also need to create class loaders to load class files when running the files. If there are a plurality of class loaders that need to be created, the electronic device may create the plurality of class loaders in a parallel manner according to the method described in the foregoing embodiments and also load the class files, thereby improving the working efficiency when the electronic device uses the class loaders to load the class files.

An embodiment of this application discloses an electronic device, including a processor, a memory connected to the processor, an input device, and an output device. The input device and the output device may be integrated into one device. For example, a touch sensor may be used as the input device, a display screen may be used as the output device, and the touch sensor and the display screen may be integrated into a touch screen.

Figure 12:
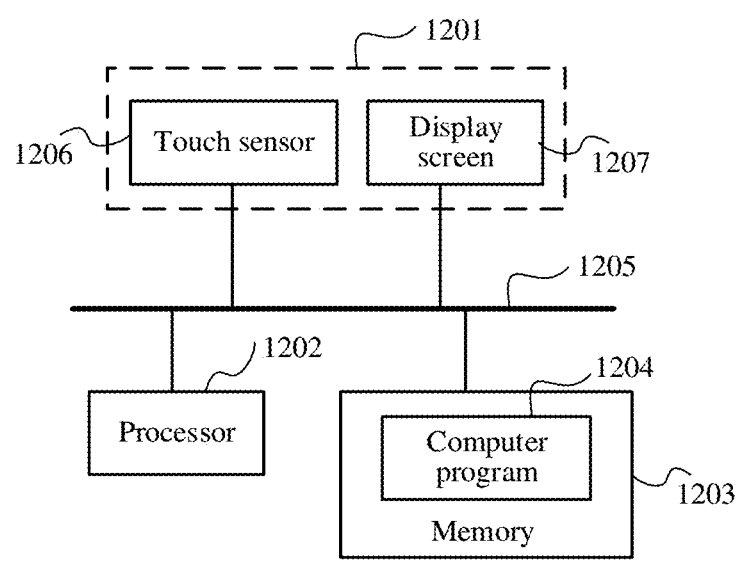
FIG. 12 is a schematic structural diagram 2 of an electronic device according to an embodiment of this application.

In this case, as shown in FIG. 12, the foregoing electronic device may include: a touchscreen 1201, the touchscreen 1201 including a touch sensor 1206 and a display screen 1207; one or more processors 1202; a memory 1203; one or more applications (not shown); and one or more computer programs 1204. The devices may be connected by one or more communication buses 1205. The one or more computer programs 1204 are stored in the memory 1203 and are configured to be executed by the one or more processors 1202. The one or more computer programs 1204 include instructions, and the instructions may be configured to perform steps in the foregoing embodiments. All related content of the steps in the foregoing method embodiments may be quoted to function descriptions of corresponding entity devices. Details are not described herein again.

For example, the processor 1202 may be specifically the processor 110 shown in FIG. 1, the memory 1203 may be specifically the internal memory 121 shown in FIG. 1, the display screen 1207 may be specifically the display screen 194 shown in FIG. 1, and the touch sensor 1206 may be specifically the touch sensor in the sensor module 180 shown in FIG. 1. This is not limited in this embodiment of this application.

Figure 13:
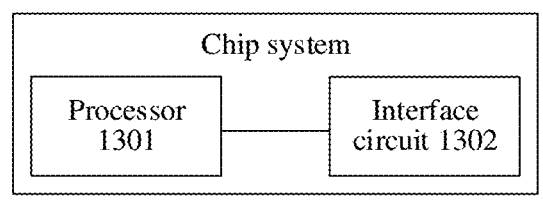
FIG. 13 is a schematic structural diagram of a chip system according to an embodiment of this application.

An embodiment of this application discloses a chip system. As shown in FIG. 13, the chip system includes at least one processor 1301 and at least one interface circuit 1302. The processor 1301 and the interface circuit 1302 may be interconnected by lines. For example, the interface circuit 1302 may be configured to receive a signal from another apparatus (such as a memory or a vibration sensor). In another example, the interface circuit 1302 may be configured to send a signal to another apparatus (for example, the processor 1301). For example, the interface circuit 1302 may read the instructions stored in the memory and send the instructions to the processor 1301. The instructions, when executed by the processor 1301, may cause the foregoing electronic device to perform the steps in the foregoing embodiments. Certainly, the chip system may further include other discrete devices. This is not specifically limited in this embodiment of this application.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above. For specific work processes of the system, the apparatus and the unit described above, reference may be made to the corresponding processes in the foregoing method embodiments. Details are not described herein again.

In this embodiment of this application, functional units in the embodiments may be integrated into one processing unit, or each of the units may exist alone physically, or two or more units are integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. An application start method, comprising:
obtaining, by a SystemServer process running in an electronic device, a start message of a first application, wherein obtaining the start message comprises obtaining, in response to an operation that a user clicks on a start icon of the first application, the start message of the first application sent by a launcher;
sending, by the SystemServer process running in the electronic device, a creation request for an application process for the first application to a daemon process in response to the start message, wherein the creation request comprises application information of the first application, wherein the application information of the first application is obtained from a directory created by the SystemServer process for the first application when the application is installed on the electronic device, and wherein the application information of the first application records an identification of one or more class loaders required for the first application;
creating, by the daemon process in the electronic device, the application process for the first application in response to the creation request, wherein the application process comprises a first thread and a second thread;
executing, by the application process of the first application, the first thread and the second thread in parallel, wherein the first thread executes initialization of a main thread of the first application, and the second thread creates a first class loader according to the application information to load a class file of the first application, and executing the first thread and the second thread in parallel comprises creating the first class loader and loading the class file of the first application using the second thread without waiting for completion of initialization of and execution of a main function of the main thread; and
after executing the first thread and the second thread in parallel, starting, by the application process of the first application, to run code of the first application, and displaying an application interface of the first application.

2. The method according to claim 1, wherein the one or more class loaders comprise the first class loader, and the application information records an identification of the first class loader, wherein
the creating, by the second thread, a first class loader according to the application information to load a class file of the first application comprises:
creating, by the second thread, the first class loader according to the identification of the first class loader, and loading a first class file of the first application by using the first class loader.

3. The method according to claim 2, wherein the one or more class loaders comprises a second class loader, the application information records an identification of the second class loader, and the application process further comprises a third thread, wherein
when the application process executes the first thread and the second thread in parallel, the method further comprises:
creating, by the third thread, the second class loader according to the identification of the second class loader, and using the second class loader to load a second class file of the first application.

4. The method according to claim 2, wherein the one or more class loaders comprises a second class loader, the application information records an identification of the second class loader, and the second class loader depends on the first class loader; the application process further comprises a third thread; and the method further comprises:
creating, by the third thread, the second class loader according to the identification of the second class loader after the third thread obtains an object lock released by the second thread, and using the second class loader to load a second class file of the first application.

5. The method according to claim 2, wherein the one or more class loaders comprises a second class loader, the application information records an identification of a second class loader, and wherein after the creating, by the second thread, the first class loader according to the identification of the first class loader, and loading a first class file of the first application by using the first class loader, the method further comprises:

creating, by the second thread, the second class loader according to the identification of the second class loader, and using the second class loader to load a second class file of the first application.

6. The method according to claim 2, wherein the first thread is the main thread of the application process, and the second thread is a temporary thread of the application process; and after the creating, by the daemon process in the electronic device, the application process for the first application, the method further comprises:

creating, by the main thread, the temporary thread, and allocating the identification of the first class loader to the temporary thread.

7. The method according to claim 1, wherein the starting, by the application process, to run code of the first application comprises:

starting, by the application process, to run the code of the first application after the first thread obtains an object lock released by the second thread.

8. The method according to claim 1, wherein before the sending, by the SystemServer process running in the electronic device, a creation request for an application process to a daemon process, the method further comprises:

obtaining, by the SystemServer process, the application information of the first application from an Android package (APK) file of the first application that is obtained from the directory created by the SystemServer process for the first application; and adding, by the SystemServer process, the application information to the creation request for the application process.

9. An application start method, comprising:

obtaining, by a SystemServer process running in an electronic device, a start message of a first application;

starting, by the SystemServer process, to verify the start message based on an application list or an application type of the first application, and in parallel with starting to verify the start message, invoking, by the SystemServer process, a first process in a process pool to start to create a class loader of the first application to load a class file of the first application when the start message comes from a launcher, wherein invoking the first process in a process pool to start to create a class loader of the first application to load the class file of the first application comprises transmitting, by the SystemServer process, application information of the first application to the first process, wherein the application information records an identification of a first class loader and an identification of a second class loader, and wherein the application information of the first application is obtained from a directory created by the SystemServer process for the first application when the application is installed on the electronic device;

invoking, by the SystemServer process, the first process to initialize a main thread of the first application when the start message is successfully verified; and starting, by the first process, to run code of the first application, and displaying an application interface of the first application.

10. The method according to claim 9, wherein the invoking, by the SystemServer process, a first process in a process pool to start to create a class loader of the first application to load a class file of the first application further comprises:

storing, by the SystemServer process, an ID of the first process in the process pool as an ID of an application process of the first application;

executing, by the first process, a first thread and a second thread in parallel, wherein the first thread creates the first class loader according to the identification of the first class loader, and loads a first class file of the first application by using the first class loader; and the second thread creates the second class loader according to the identification of the second class loader, and uses the second class loader to load a second class file of the first application.

11. The method according to claim 10, wherein the invoking, by the SystemServer process, the first process to initialize a main thread of the first application further comprises:

invoking, by the SystemServer process, the main thread in the first process according to the ID of the application process of the first application to execute a main function of ActivityThread.

12. The method according to claim 11, wherein the starting, by the first process, to run code of the first application comprises:

starting, by the first process, to run code of the first application after the main thread obtains an object lock released by the first thread and an object lock released by the second thread.

13. The method according to claim 9, wherein when the start message fails to be verified, the method further comprises:

releasing, by the SystemServer process, an occupied first process, and deleting the created class loader and the loaded class file.

14. An electronic device, comprising:

a touch screen, comprising a touch sensor and a display screen;

one or more processors; and a memory, wherein the memory stores one or more computer programs, the one or more computer programs comprise instructions, and the instructions, when executed by the electronic device, cause the electronic device to perform operations comprising:

obtaining, by a SystemServer process running in the electronic device, a start message of a first application, wherein obtaining the start message comprises obtaining, in response to an operation that a user clicks on a start icon of the first application, the start message of the first application sent by a launcher;

sending, by the SystemServer process running in the electronic device, a creation request for an application process for the first application to a daemon process in response to the start message, wherein the creation request comprises application information of the first application, wherein the application information of the first application is obtained from a directory created by the SystemServer process for the first application when the application is installed on the electronic device, and wherein the application information of the first application records an identification of one or more class loaders required for the first application;

creating, by the daemon process in the electronic device, the application process for the first application in response to the creation request, wherein the application process comprises a first thread and a second thread;

executing, by the application process of the first application, the first thread and the second thread in parallel, wherein the first thread executes initialization of a main thread of the first application, and the second thread creates a first class loader according to the application information to load a class file of the first application, and executing the first thread and the second thread in parallel comprises creating the first class loader and loading the class file of the first application using the second thread without waiting for completion of initialization of and execution of a main function of the main thread; and after executing the first thread and the second thread in parallel, starting, by the application process of the first application, to run code of the first application, and displaying an application interface of the first application.

* * * * *